US012655232B2

(12) United States Patent
Zhou et al.

(10) Patent No.: US 12,655,232 B2
(45) Date of Patent: Jun. 16, 2026

(54) DEVICE FOR PRETREATING REFINED COTTON AND METHOD OF USE OF SAME

(71) Applicant: HUBEI JINHANJIANG REFINED COTTON CO., LTD, Zhongxiang (CN)

(72) Inventors: Hangxu Zhou, Zhongxiang (CN); Zongqing Fan, Zhongxiang (CN); Jintao Fan, Zhongxiang (CN); Liwei Li, Zhongxiang (CN); Hongju Zhan, Zhongxiang (CN)

(73) Assignee: HUBEI JINHANJIANG REFINED COTTON CO., LTD. (CN)

( * ) Notice: Subject to any disclaimer, the term of this patent is extended or adjusted under 35 U.S.C. 154(b) by 501 days.

(21) Appl. No.: 18/456,289

(22) Filed: Aug. 25, 2023

(65) Prior Publication Data

US 2024/0191001 A1    Jun. 13, 2024

(30) Foreign Application Priority Data

Dec. 9, 2022    (CN) .......................... 202211576292.4

(51) Int. Cl.
*C08B 1/10* (2006.01)
*B01D 29/03* (2006.01)
*B01D 29/64* (2006.01)
*B01J 19/20* (2006.01)

(52) U.S. Cl.
CPC ............... *C08B 1/10* (2013.01); *B01D 29/03* (2013.01); *B01D 29/6423* (2013.01); *B01D 29/6484* (2013.01); *B01J 19/20* (2013.01)

(58) Field of Classification Search
CPC ....................................................... C08B 1/10
See application file for complete search history.

(56) References Cited

U.S. PATENT DOCUMENTS 2,527,141 A * 10/1950 Mantell .................. D06M 11/44
8/118
4,022,574 A * 5/1977 Ichihara ................. D06M 11/40
8/127

* cited by examiner

*Primary Examiner* — Andrew T Piziali

(57) ABSTRACT

A device for pretreating refined cotton and a method of use thereof are provided. The device includes a body frame including a lower baseplate, four columns mounted on the upper surface of the lower baseplate, and an upper baseplate mounted at the top of the four columns, a first rotation shafts are fixed on the front and rear sides of a pretreatment drum, a lateral support is rotationally installed on the outer surface of the first rotation shaft; a power drive mechanism, a material-allocating mechanism and a reciprocating swing mechanism cooperate with a spraying mechanism, the stroke switch of the material-allocating mechanism cooperates with the power drive mechanism to achieve the forward and backward movement of the power drive mechanism, cooperates with the reciprocating swing mechanism to achieve the repeated swinging of the pretreatment drum, cooperates with the material-allocating mechanism to achieve the repeated fluctuation of the material.

10 Claims, 11 Drawing Sheets

DEVICE FOR PRETREATING REFINED COTTON AND METHOD OF USE OF SAME

CROSS-REFERENCE TO RELATED APPLICATIONS

This application claims priority to Chinese Application No. 202211576292.4, having a filing date of Dec. 9, 2022, the entire contents of which are hereby incorporated by reference.

FIELD

The present invention relates to the technical field of refined cotton, in particular to a device for pretreating refined cotton and a method of use thereof.

BACKGROUND

Refined cotton is of cotton cellulose material prepared by using a cotton linter as raw material to pass through the main processes such as opening, alkali pretreating, alkali treating, boiling, bleaching, squeezing and dewatering, drying and so on, and mainly used to produce cellulose of ether, nitrification and acetate. Such material is widely applied in many fields such as food, medicine, chemicals for daily use, plastics, electronics, papermaking, metallurgy, aerospace and so on, known as a special industrial gourmet powder.

Alkali pretreating is a process to spray a boiling agent evenly on the raw material of linters, so as to facilitate subsequent alkali treating. The effect of alkali pretreating will determine the quality of the subsequent alkali treating and boiling and degreasing. In the existing alkali pretreating device, a cyclone tube is used to spray lye on the surface of the raw material of linters, but due to the uneven opening size of linters in the preceding opening process, it will cause linter fibers uneven reception of the boiling agent for pre-soaking, so such device will affect the quality of the subsequent alkali treating.

SUMMARY

The objective of the present invention is to perform even pretreating and solve the deficiency of existing pretreating device by providing a device for pretreating refined cotton and a method of use thereof.

In order to achieve the above object, the technical scheme adopted in the present invention is as follows:

A device for pretreating refined cotton, comprising a body frame, a pretreatment drum, a material-allocating mechanism, a reciprocating swing mechanism, a spraying mechanism, a scraping mechanism, and a power drive mechanism;

the body frame includes a lower baseplate, four columns mounted on the upper surface of the lower baseplate, and an upper baseplate mounted at the top of the four columns;

first rotation shafts are fixed on the front and rear sides of the pretreatment drum, a lateral support is rotationally installed on the outer surface of the first rotation shaft, and fixedly on the upper surface of the upper baseplate, a discharge door is hinged on the back of the pretreatment drum, an arc-shaped material receiving cover is fixedly installed on the upper baseplate, a liquid outlet facing the arc-shaped material receiving cover is opened on the outer surface of the pretreatment drum, a strainer is installed on the inner wall of the liquid outlet, a connecting tube is installed on the arc-shaped material receiving cover, and passes through the upper baseplate and extends to the lower part of the upper baseplate;

the material-allocating mechanism is arranged on the pretreatment drum, used to perform alkali pretreating on the material added into the pretreatment drum;

the reciprocating swing mechanism is arranged on the upper surface of the upper baseplate, used to drive the pretreatment drum to swing left and right around the axle center of the axis where the first rotation shaft is positioned;

the spraying mechanism is arranged on the lower baseplate, used to spray lye into the pretreatment drum to perform alkali treatment, and a residue-filtering strainer is arranged on the spraying mechanism;

the scraping mechanism is arranged on the spraying mechanism, used to scrape the material returned to the residue-filtering strainer via the connecting tube, ensuring the recycling of lye;

the power drive mechanism is arranged on the side of the upper baseplate, used to drive the reciprocating swing mechanism and the scraping mechanism to synchronously operate.

Due to the adoption of the scheme, for the device for pretreating refined cotton and the method of use thereof, the power drive mechanism, the material-allocating mechanism and the reciprocating swing mechanism are configured to cooperate with the spraying mechanism, the stroke switch of the material-allocating mechanism cooperates with the motor of the power drive mechanism to achieve the forward and backward movement of the power drive mechanism, cooperates with the reciprocating swing mechanism to achieve the repeated swinging of the pretreatment drum, cooperates with the material-allocating mechanism to achieve the repeated fluctuation of the material, and then realize the effective stirring of the material, and cooperates with the spraying mechanism to spray lye, so as to achieve a highly-efficient alkali pretreating operation, ensuring the uniform degree of exterior and interior material soaked in alkali. The device has a simple structure and a good performance in overall mechanical interaction. For the device for pretreating refined cotton and the method of use thereof, the residue-filtering strainer is configured to cooperate with the scraping mechanism and the power drive mechanism, so as to drive the scraping mechanism to synchronize the repeated movement forwards and backwards when the power drive mechanism repeatedly operates forwards and backwards, and then scrap the particles on the surface of the residue-filtering strainer into the recessed area of the residue-filtering strainer, thereby preventing the accumulation and blockage of particles, ensuring the smooth reflux and reuse of liquid, and avoiding wasting. For the device for pretreating refined cotton and the method of use thereof, the sliding plate is configured to cooperate with the first locking rod, the first spring and the inserting rod, so as to drive the guiding plate to insert the first locking rod into the first locking hole under the action of the elasticity of the first spring, such configuration helps to disassemble and assemble the scraping mechanism, and then to cooperate with an installation bolt to disassemble and assemble the residue-filtering strainer, so it is convenient to operate, easy to clean and use, and improves the functional diversity.

In the scheme, it should be noted that both the motor and spraying pump are electrically connected to an external power source.

As a preferred embodiment, the material-allocating mechanism includes a second rotation shaft rotationally installed on the pretreatment drum, a first gear fixedly installed on the outer surface of the end of the second rotation shaft, a resisting block fixedly installed on the side of the first gear, a first arc-shaped rack fixedly installed on one of the lateral supports and engaging with the first gear, stroke switches respectively fixed at both ends of the arc-shaped rack and cooperating with the resisting block, a disk fixedly installed on the outer surface of the first rotation shaft, a plurality of third rotation shafts arranged in a circular array and rotationally installed on the disk, a plurality of material-allocating rods fixedly installed on the outer surface of the second rotation shaft and the outer surface of the third rotation shaft, a second gear fixedly installed at the end of the third rotation shaft, and an inner toothed ring fixedly installed on the inner wall of the pretreatment drum and engaging with a plurality of second gears, and the side of the inner toothed ring fits on the side of the disk.

Due to the adoption of the scheme, the first gear engages with the first arc-shaped rack, when the second rotation shaft rotates with the pretreatment drum around the axis of the first rotation shaft, the first gear will drive the second rotation shaft two to synchronously rotate under the action of the first arc-shaped rack. Therefore, at this time, the pretreatment drum rotates around the other axis, while the second rotation shaft rotates on its own axis. Furthermore, the stroke switch cooperates with the resisting block, so that the first gear drives the first rotation shaft to move to one end, then control the power drive mechanism to operate in reverse, and then the second rotation shaft can rotate forwards and backwards, and drive the third rotation shaft and the second rotation shaft to synchronously rotate forwards and backwards under the action of the second gear and the inner toothed ring, thereby achieve high-precisely allocating materials, enabling the materials to be turned quickly and ensuring uniform degree of exterior and interior material soaked in alkali.

As a preferred embodiment, the reciprocating swing mechanism includes two articulated arms cooperating with the power drive mechanism, an articulated block hinged on the other ends of the two articulated arms, a rack plate installed on the side of the articulated block, a second arc-shaped rack installed on the outer surface of the pretreatment drum and cooperating with the rack plate, and a sliding block installed on the lower surface of the rack plate, a strip-shaped channel is opened on the upper surface of the upper baseplate, a first sliding rod is fixed on the inner wall of the strip-shaped channel, the sliding block is slidably installed on the outer surface of the first sliding rod.

Due to the adoption of the scheme, the articulated arm cooperates with the power drive mechanism, so as to enable the articulated block to drive the rack plate to repeatedly move left and right under the action of the articulated arm, when the power drive mechanism operates forwards and backwards. In this way, the rack plate engages with the second arc-shaped rack, so as to drive the pretreatment drum to continuously swing repeatedly, and then the cooperation with the material-allocating mechanism effectively improves the stirring effect of materials and further improves the effect of alkali treating. The first sliding rod is configured to cooperate with the sliding block, ensuring that the better stability of the rack plate in left and right motion.

As a preferred embodiment, the spraying mechanism includes a material box installed on the lower surface of the lower baseplate, a spraying pump installed on the side of the material box and having its inlet tube extending to the inside of the material box, a delivering pipe communicating with the outlet tube of the spraying pump, an installation plate communicating with the other end of the delivering pipe and detachably installed on the upper surface of the pretreatment drum, and a plurality of spraying heads installed on the lower surface of the installation plate and communicating with the delivering pipe, two supporting bars is fixedly installed on the inner wall of the material box, two sides of the lower surface of the residue-filtering strainer fit on the upper surfaces of the two supporting bars, the residue-filtering strainer is provided with an installation bolt threadedly installed thereon and connected to the supporting bar by means of the installation bolt, and a drain is installed on the side of the material box.

Due to the adoption of the scheme, the lye inside the material box is drawn by the spraying pump and conveyed via the delivering pipe, then sprayed out through the spraying head, so as to achieve an alkali treating operation. Furthermore, the residue-filtering strainer is locked and fixed with the support of the supporting bar and the installation bolt, which ensure the effective installation of the residue-filtering strainer and are easy to disassemble and assemble. Furthermore, the residue-filtering strainer can filter the liquid back flowing from the arc-shaped material receiving cover and the connecting tube, ensuring the reuse of lye and avoiding wasting.

As a preferred embodiment, the scraping mechanism includes two connecting rods cooperating with the power drive mechanism, a sliding plate installed at the end of the connecting rod, two lateral supporting plates installed between two columns on the same side, two second sliding rods installed between the two lateral supporting plates for the sliding plate sliding thereon, and a scraper brush detachably installed on the lower surface of the sliding plate, and the lower surface of the scraper brush fits on the upper surface of the residue-filtering strainer.

Due to the adoption of the scheme, the connecting rod cooperates with the power drive mechanism, so as to drive the sliding plate to synchronously move by means of the connecting rod during the operation of the power drive mechanism, and then drive the scraper brush to synchronously move, thereby effectively cleaning the surface of the residue-filtering strainer to avoid the accumulation and blockage of particles.

As a preferred embodiment, the power drive mechanism includes two lateral keeping-off blocks fixedly installed on the side of the upper baseplate, a fourth rotation shaft rotationally installed on the lateral keeping-off block, a motor installed on the side of one of lateral keeping-off blocks and having its output shaft connected to the fourth rotation shaft, a bidirectional screw fixedly installed between two fourth rotation shafts, and two moving blocks threadedly installed on the two-segment threaded outer surface of the bidirectional screw, the upper surface of the moving block is connected with one end of the articulated arm by means of a hinge joint, the side of the moving block is fixedly connected with one end of the connecting rod, a first guiding rod is installed between the two lateral keeping-off blocks, the moving block is slidably installed on the outer surface of the first guiding rod, and the motor is electrically connected with the stroke switch.

Due to the adoption of the scheme, the fourth rotation shaft is configured to cooperate with the bidirectional screw and the motor, the motor drives the fourth rotation shaft to rotate during its operation, the fourth rotation shaft rotates to drive the bidirectional screw to rotate, and then the latter drives the moving block to move. Meanwhile, the stroke switch cooperates with the motor, so as to control the motor to rotate forwards and backwards and then achieve the relative movement of the two moving blocks, thereby enabling the pretreatment drum to repeatedly swing and the scraper brush to move forwards and backwards.

As a preferred embodiment, the first fixing block is fixed on the upper surface of the installation plate, a cross bar is slidably installed on the first fixing block, a second locking rod is fixed on one end of the crossbar, a locking plate is fixed on the other end of the crossbar, the outside of the crossbar is sleeved with a second spring having two ends respectively connected to the first fixing block and the second locking rod, a second fixing block is fixed on the upper surface of the pretreatment drum, and a second locking hole for inserting a first locking rod is opened on the second fixing block.

Due to the adoption of the scheme, the elasticity of the second spring is used to cooperate with the crossbar, so that the crossbar drives the second locking rod to move. In this way, the second locking rod cooperates with the second locking hole on the second fixing block, so as to achieve rapidly disassembling and assembling the installation plate, providing a simple structure and a convenient operation.

As a preferred embodiment, the residue-filtering strainer has three recessed areas, among them, one recessed area is located in the middle of the residue-filtering strainer, and the other two recessed areas are located on the front and rear sides of the residue-filtering strainer.

Due to the adoption of the scheme, the recessed areas are arranged on the residue-filtering strainer, so that the scraper brush can scrap the particles to the recessed areas to be collected during moving, avoiding the blockage caused by the accumulated particles.

As a preferred embodiment, a plurality of second guiding rods are fixedly installed on the side of the sliding plate, a limit disk is fixed on the end of the second guiding rod, a guiding plate is slidably installed on the outer surface of the second guiding rod, the outside of the second guiding rod is sleeved with a first spring having two ends respectively connected to the limit disk and the guiding plate, the first locking rod is fixed on the side of the guiding plate, an inserting rod is installed on the upper surface of the scraper brush, a rod groove for the inserting rod is opened on the lower surface of the sliding plate, a circular hole for inserting the first locking rod and communicating with the rod groove is opened on the sliding plate, and a first locking hole for inserting the first locking rod is opened on the inserting rod.

Due to the adoption of the scheme, the second guiding rod cooperates with the first spring, so as to guide and support the guiding plate, so that the guiding plate has better stability during moving, and it is not easy to shake, furthermore, the guiding plate has better stability when it drives the first locking rod to move. The first locking rod cooperates with the first locking hole, to achieve rapidly disassembling and assembling the scraper brush, so it is convenient for operation and use.

A method of use of the device for pretreating refined cotton, comprising the steps of:

S1, feeding, pressing the locking plate to drive the crossbar to move, enabling the crossbar to drive the second locking rod to disengage the second locking hole on the second fixing block, unlocking the installation plate, removing the installation plate, adding the material to be processed into the pretreatment drum, after adding the material, pulling the locking plate again to misalign the second locking rod with the first fixing block, after placing the installation plate on the pretreatment drum, driving the second locking rod to return its original position to be inserted into the second locking hole on the second fixing block under the action of the elasticity of the second spring, finishing locking the installation plate, or instead of the above, directly the material from the both sides of the installation plate, then pouring lye into the material box;

S2, alkali pretreating, starting the motor to enable the motor to drive the bidirectional screw to rotate by means of the fourth rotation shaft, enabling the bidirectional screw to rotate to drive two moving blocks to move with respect to each other, for the two moving blocks during moving close to each other, enabling the articulated block to drive the rack plate to move left under the articulation of the articulated arm, at this time under the engagement of the rack plate and the second arc-shaped rack, enabling the pretreatment drum to swing clockwise around the axis of the first rotation shaft, for the pretreatment drum during swinging clockwise, driving the second rotation shaft to synchronously rotate around the axis of the first rotation shaft, for the second rotation shaft during following the pretreatment drum, driving the first rotation shaft to rotate under the engagement of the first gear and the first arc-shaped rack, meanwhile for the first rotation shaft during its rotation, driving the disk to rotate and enabling the third rotation shaft to synchronously rotate under the engagement of the second gear and the inner toothed ring so as to enable the second rotation shaft and the third rotation shaft to rotate synchronously, for first gear at moving until the keeping-off block touches the stroke switch on one side, driving the motor to reverse, and then driving the two moving blocks to move far away from each other, so as to enable the articulated block to drive the rack plate to move right under the articulation of the articulated arm, thus drive the pretreatment drum to swing counterclockwise and drive the second rotation shaft and the third rotation shaft to rotate counterclockwise, for the keeping-off block at touching the stroke switch on the other side, controlling the motor to reverse, so as to move backwards and forwards to enable the pretreatment drum to effectively swing and vibrate with the material-allocating rods, meanwhile for spraying pump, drawing the lye in the material box to spray to the pretreatment drum via the delivering pipe and the spraying head, so as to achieve alkali pretreating by way of cooperating with the material-allocating rods; and S3, reusing lye, enabling excess lye to back flow and fall via the arc-shaped material-receiving cover and the connecting tube, filtering large particles under the action of the residue-filtering strainer so as to flow back the liquid for reuse, meanwhile for the moving block during moving repeatedly, driving the sliding plate to move by means of the connecting rod so as to enable the sliding plate to drive the scraper brush to move backwards and forwards, thus for the scraper brush, scraping the particles on the residue-filtering strainer into the recessed area of the residue-filtering strainer to prevent the accumulation and blockage of the particles on the surface of the residue-filtering strainer, if needing to clean the residue-filtering strainer, firstly pulling the guiding plate to drive the first locking rod to move, so as to release the fixation of the scraper brush, secondly removing the scraper brush then unscrewing the installation bolt to release the fixation of the residue-filtering strainer, finally pulling out the residue-filtering strainer upwards.

Compared with the prior art, the present invention has the following beneficial effects.

For the device for pretreating refined cotton and the method of use thereof, the power drive mechanism, the material-allocating mechanism and the reciprocating swing mechanism are configured to cooperate with the spraying mechanism, the stroke switch of the material-allocating mechanism cooperates with the motor of the power drive mechanism to achieve the forward and backward movement of the power drive mechanism, cooperates with the reciprocating swing mechanism to achieve the repeated swinging of the pretreatment drum, cooperates with the material-allocating mechanism to achieve the repeated fluctuation of the material, and then realize the effective stirring of the material, and cooperates with the spraying mechanism to spray lye, so as to achieve a highly-efficient alkali pretreating operation, ensuring the uniform degree of exterior and interior material soaked in alkali. The device has a simple structure and a good performance in overall mechanical interaction.

For the device for pretreating refined cotton and the method of use thereof, the residue-filtering strainer is configured to cooperate with the scraping mechanism and the power drive mechanism, so as to drive the scraping mechanism to synchronize the repeated movement forwards and backwards when the power drive mechanism repeatedly operates forwards and backwards, and then scrap the particles on the surface of the residue-filtering strainer into the recessed area of the residue-filtering strainer, thereby preventing the accumulation and blockage of particles, ensuring the smooth reflux and reuse of liquid, and avoiding wasting.

For the device for pretreating refined cotton and the method of use thereof, the sliding plate is configured to cooperate with the first locking rod, the first spring and the inserting rod, so as to drive the guiding plate to insert the first locking rod into the first locking hole under the action of the elasticity of the first spring, such configuration helps to disassemble and assemble the scraping mechanism, and then to cooperate with an installation bolt to disassemble and assemble the residue-filtering strainer, so it is convenient to operate, easy to clean and use, and improves the functional diversity.

Where, 1—body frame; 2—lower baseplate; 3—column; 4—upper baseplate; 5—pretreatment drum; 6—first rotation shaft; 7—lateral support; 8—material-allocating mechanism; 9—power drive mechanism; 10—reciprocating swing mechanism; 11—scraping mechanism; 12—spraying mechanism; 13—residue-filtering strainer, 14—stroke switch; 15—first arc-shaped rack; 16—second rotation shaft; 17—first gear; 18—resisting block; 19—disk; 20—third rotation shaft; 21—material-allocating rod; 22—second gear; 23—inner toothed ring; 24—arc-shaped material receiving cover, 25—connecting tube; 26—lateral keeping-off block; 27—fourth rotation shaft; 28—bidirectional screw; 29—motor; 30—moving block; 31—first guiding rod; 32—articulated arm; 33—articulated block; 34—rack plate; 35—sliding block; 36—first sliding rod; 37—connecting rod; 38—sliding plate; 39—second sliding rod; 40—lateral supporting plate; 41—second guiding rod; 42—limit disk; 43—first spring, 44—first locking rod; 45—inserting rod; 46—scraper brush; 47—material box; 48—supporting bar, 49—guiding plate; 50—installation bolt; 51—spraying pump; 52—delivering pipe; 53—installation plate; 54—spraying head; 55—first fixing block; 56—second locking rod; 57—locking plate; 58—second fixing block; 59—second spring, 60—second arc-shaped rack; 65—strainer, 66—liquid outlet; 67—strip-shaped channel; 68—crossbar; 69—recessed area; 70—rod groove; 71—circular hole; 72—first locking hole; 73—second locking hole.

DETAILED DESCRIPTION

Figure 1:
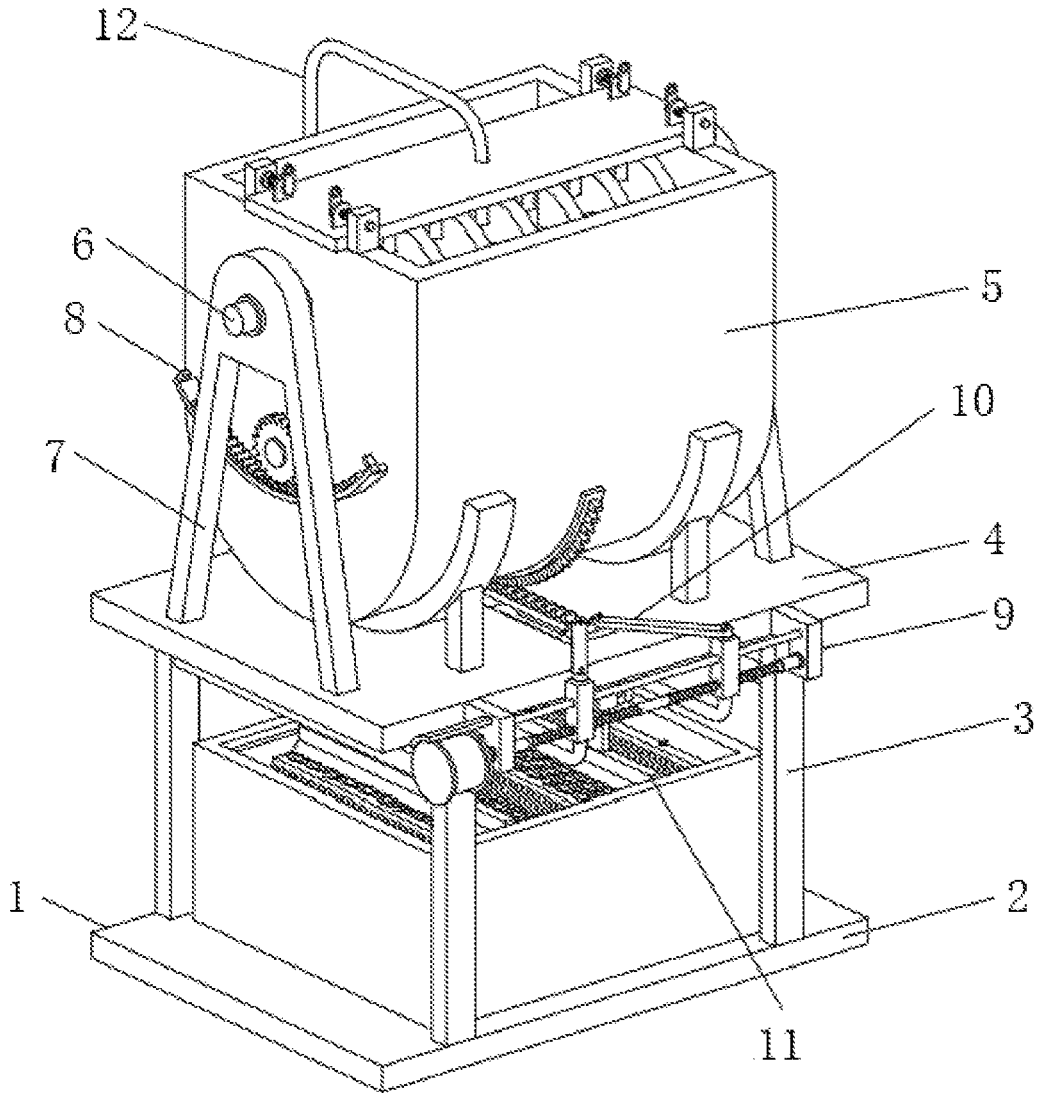
FIG. 1 is a structure diagram of the present invention.
Figure 2:
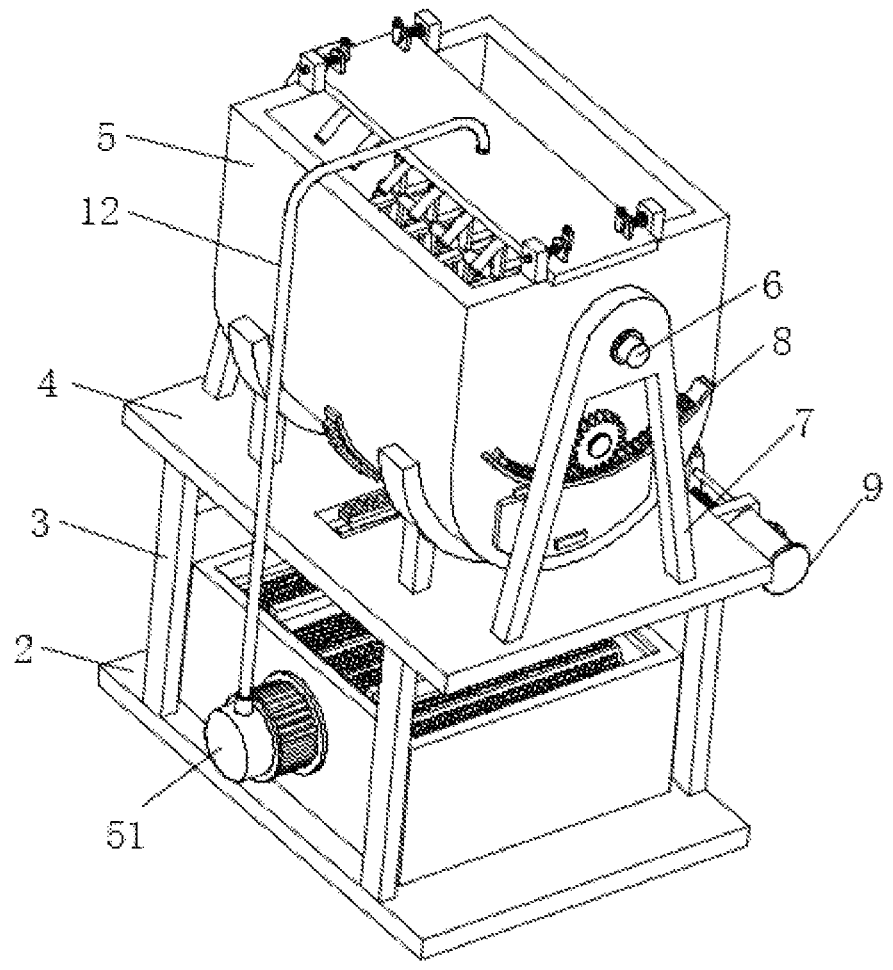
FIG. 2 is a structure diagram of the present invention at another angle of view.
Figure 3:
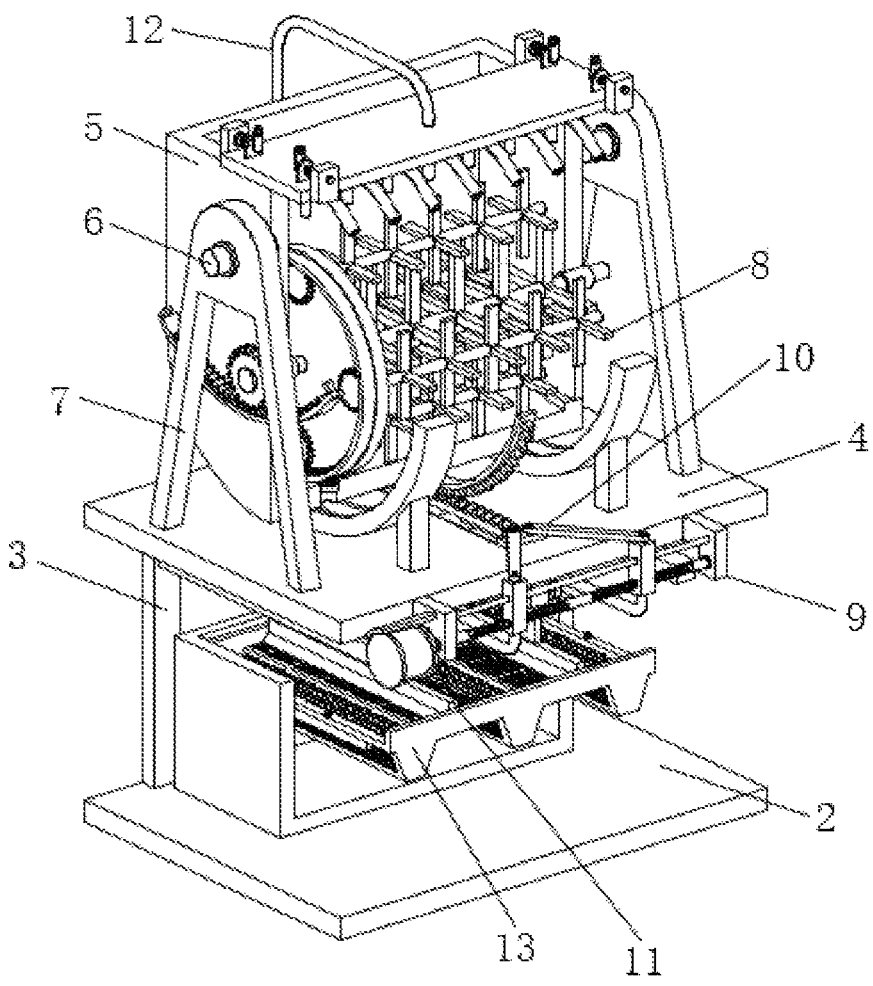
FIG. 3 shows cross sections of the material box and the pretreatment drum according to the present invention.
Figure 4:
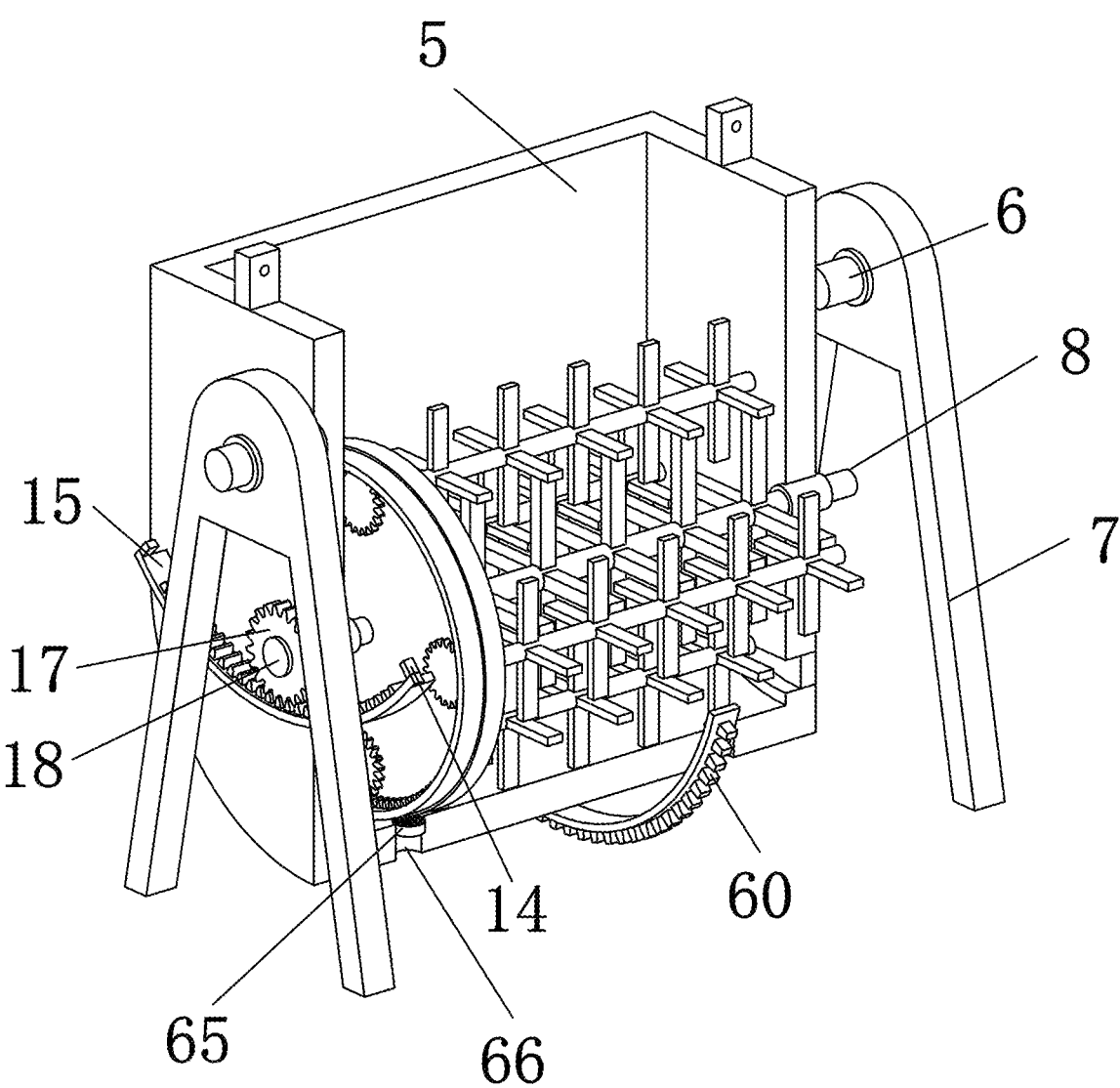
FIG. 4 shows a cross section of the pretreatment drum according to the present invention.
Figure 5:
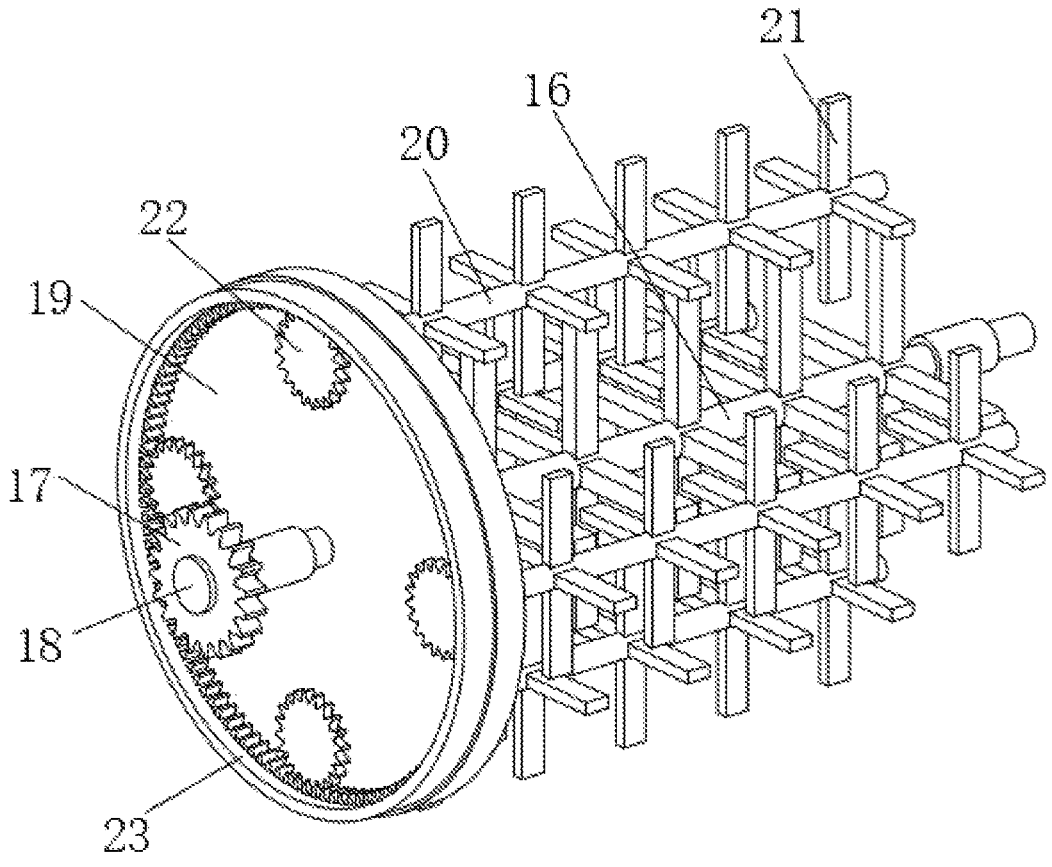
FIG. 5 is a structure diagram of the material-allocating mechanism according to the present invention.
Figure 6:
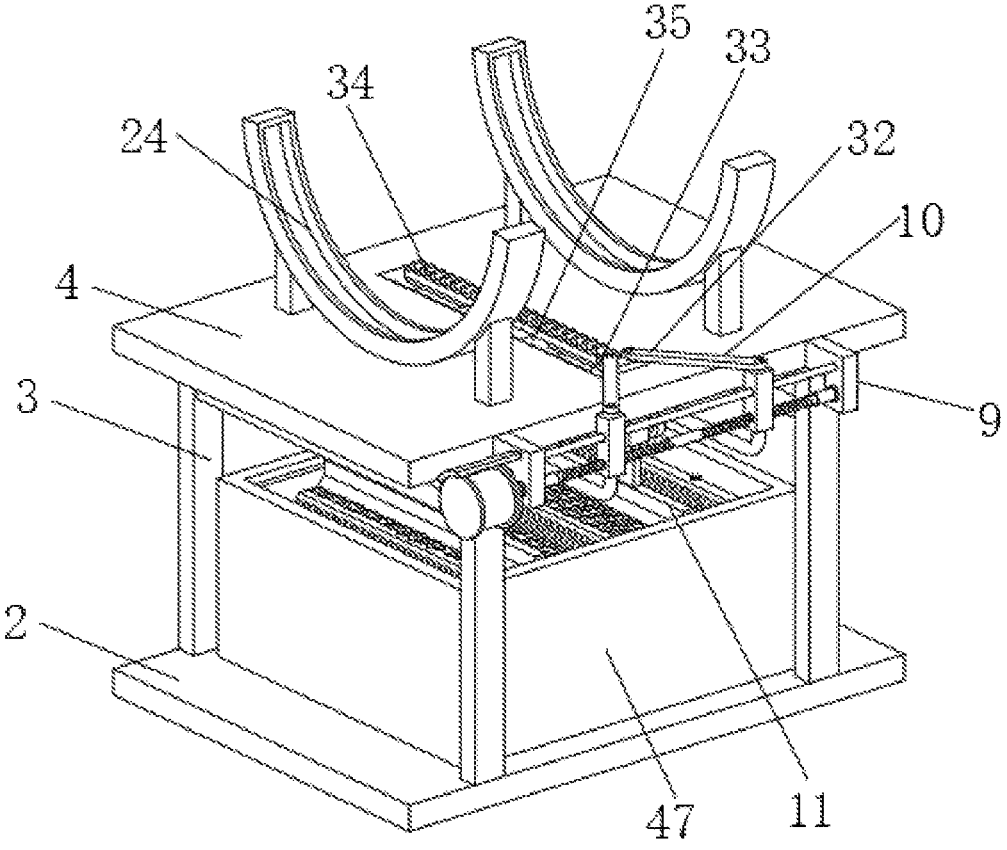
FIG. 6 is a structure diagram of the body frame according to the present invention.
Figure 7:
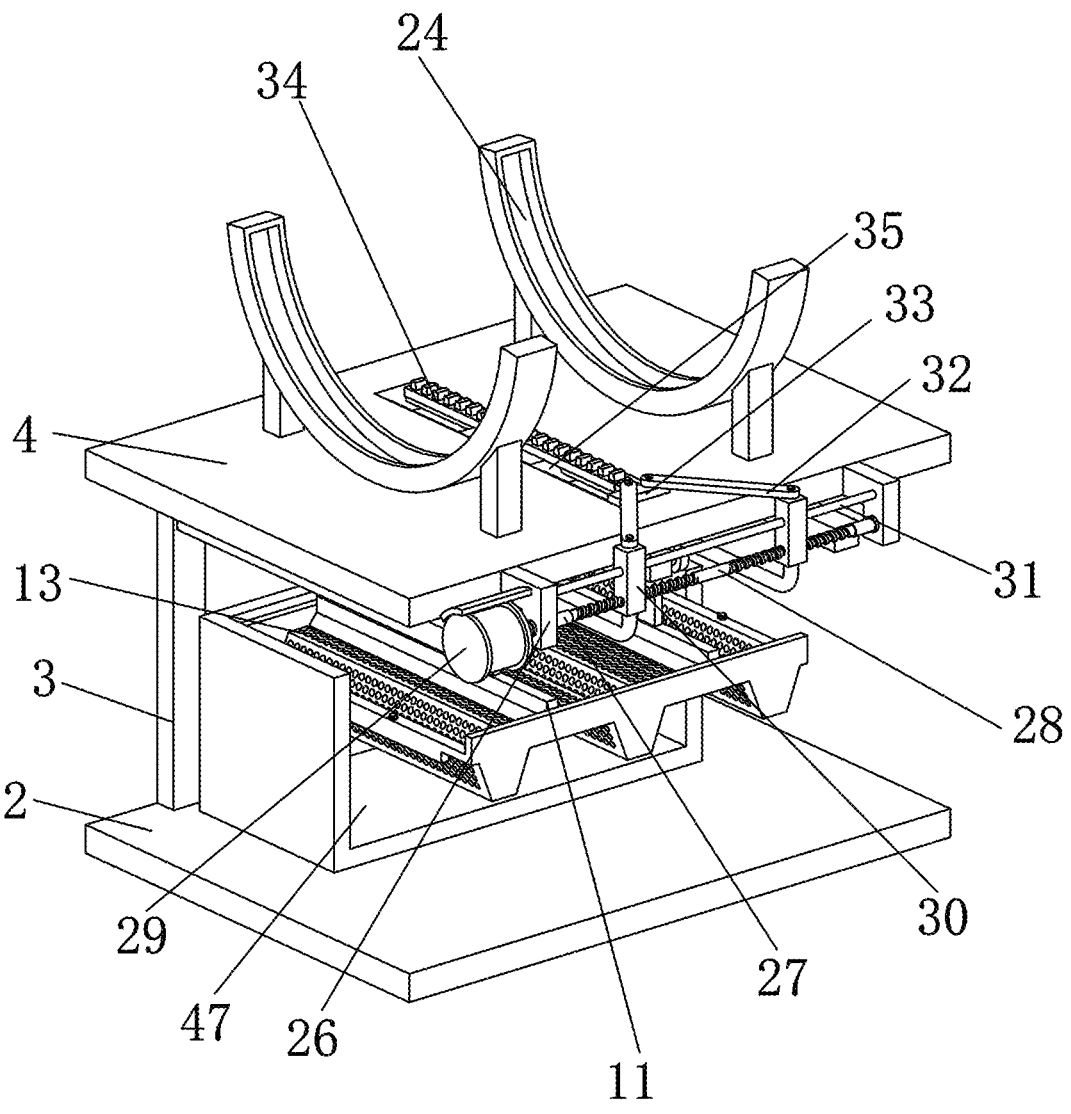
FIG. 7 shows a cross section of the material box according to the present invention.
Figure 8:
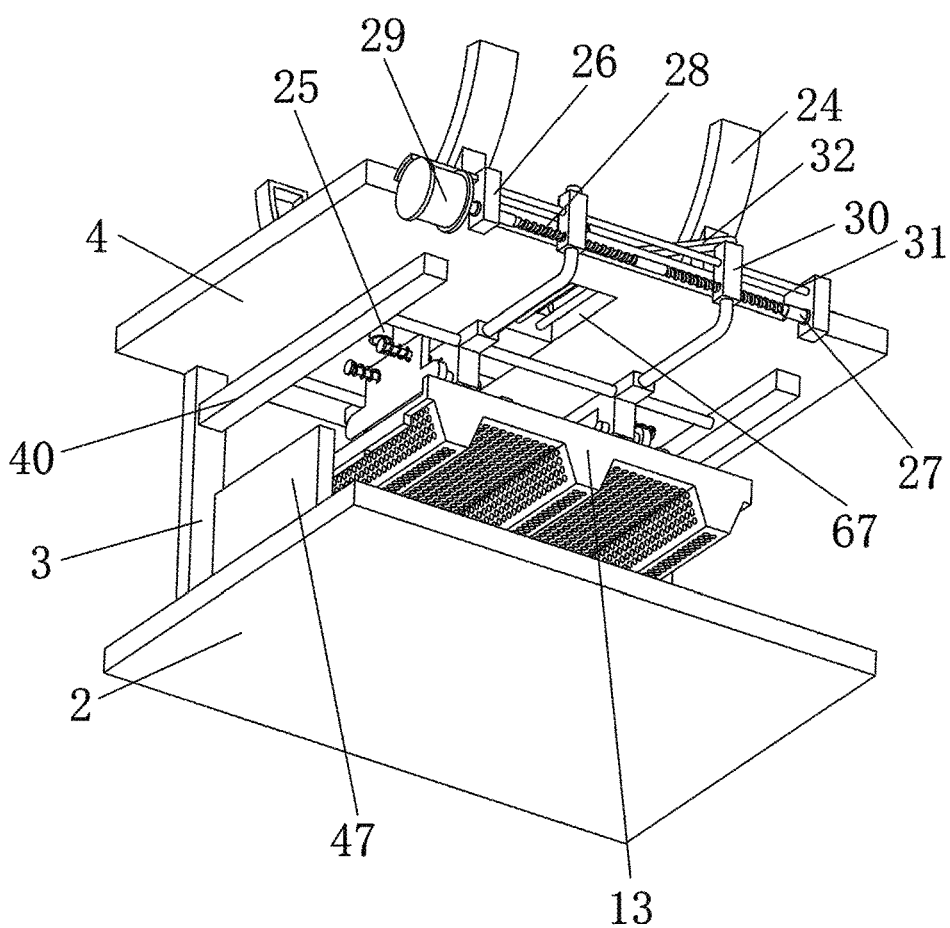
FIG. 8 shows a cross section of the material box according to the present invention at another angle of view.
Figure 9:
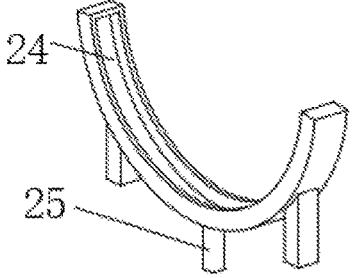
FIG. 9 is a structure diagram of the arc-shaped material-receiving cover according to the present invention.
Figure 10:
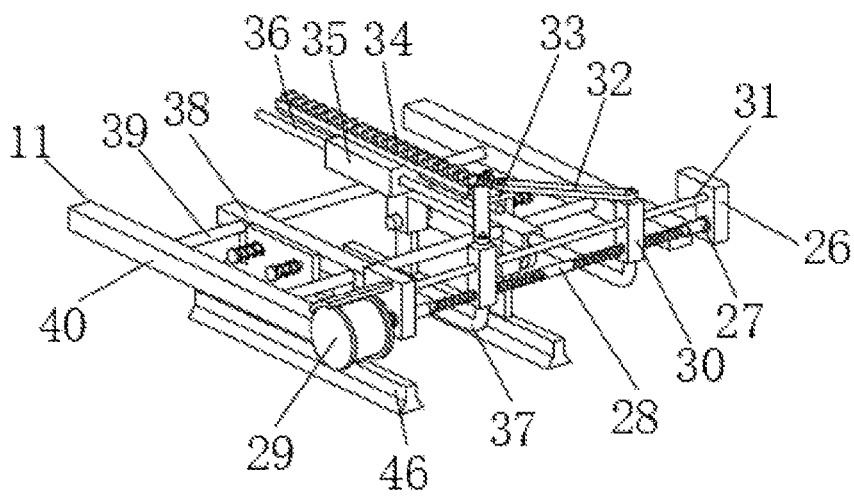
FIG. 10 is a structure diagram of the power drive mechanism and the scraping mechanism according to the present invention.
Figure 11:
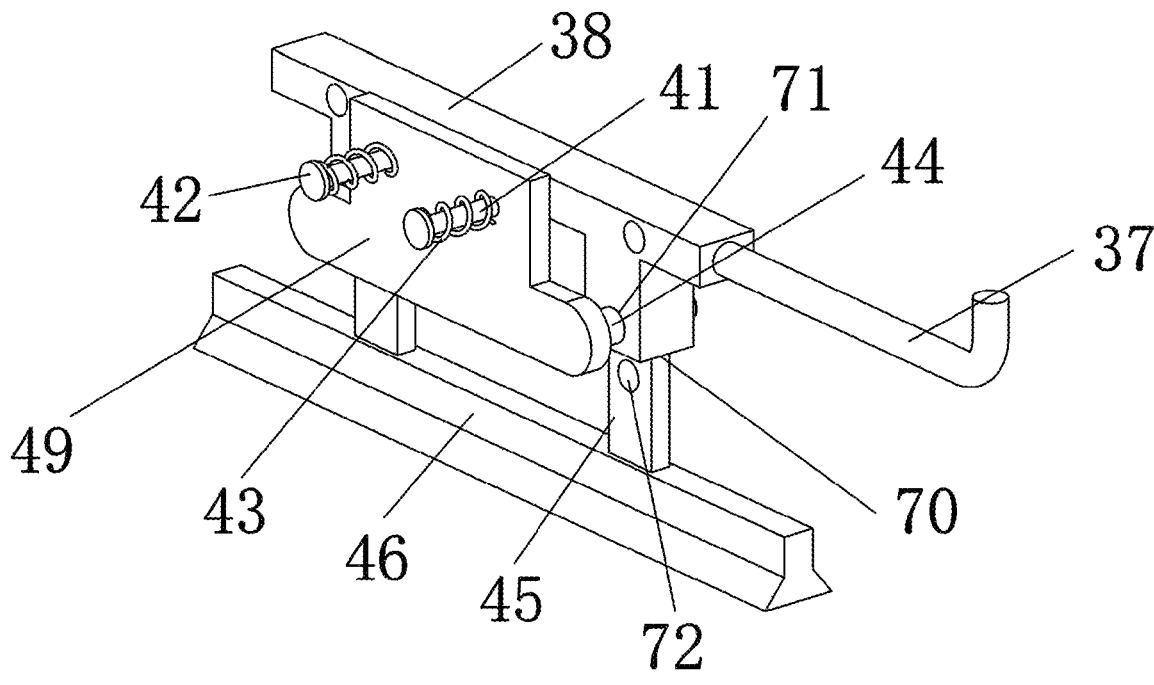
FIG. 11 is a structure diagram of the sliding plate and the scraper brush according to the present invention.
Figure 12:
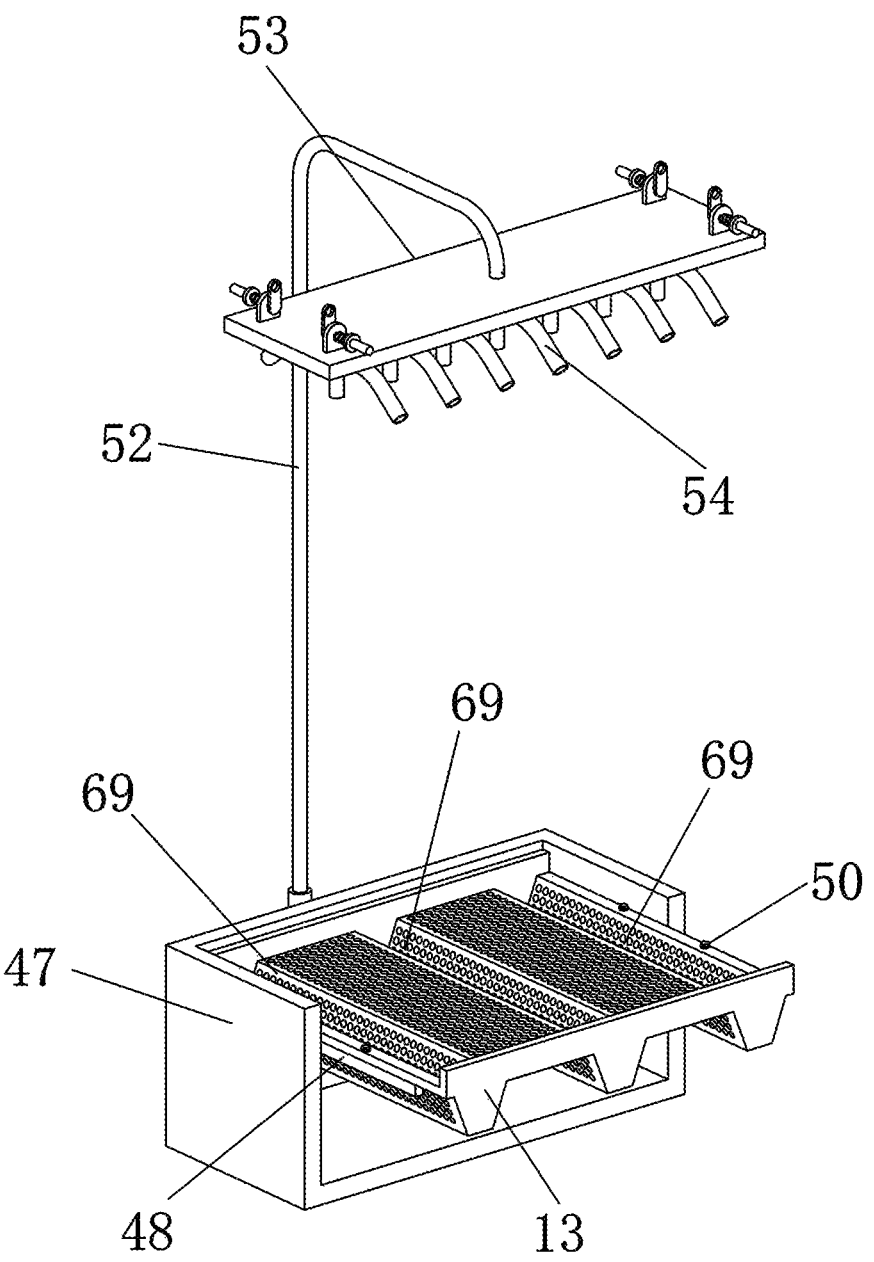
FIG. 12 is a structure diagram of the spraying mechanism according to the present invention.
Figure 13:
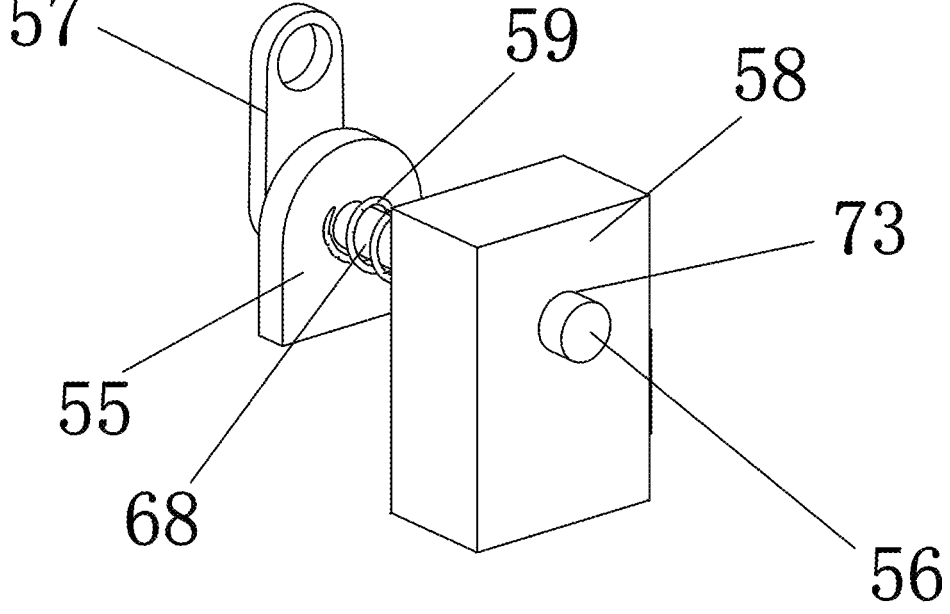
FIG. 13 is a structure diagram of the first fixing block and the second fixing block according to the present invention.

Referring to FIGS. 1-13, the present invention provides a device for pretreating refined cotton, which includes the body frame 1, wherein the body frame 1 includes the lower baseplate 2, four columns 3 mounted on the upper surface of the lower baseplate 2, and the upper baseplate 4 mounted at the top of the four columns 3.

The first rotation shafts 6 are fixed on the front and rear sides of the pretreatment drum 5. The lateral support 7 is rotationally installed on the outer surface of the first rotation shaft 6, and fixedly on the upper surface of the upper baseplate 4. A discharge door is hinged on the back of the pretreatment drum 5. The arc-shaped material receiving cover 24 is fixedly installed on the upper baseplate 4. A liquid outlet 66 facing the arc-shaped material receiving cover 24 is opened on the outer surface of the pretreatment drum 5. The strainer 65 is installed on the inner wall of the liquid outlet 66. The connecting tube 25 is installed on the arc-shaped material receiving cover 24, and passes through the upper baseplate 4 and extends to the lower part of the upper baseplate 4. The strainer 65 is arranged inside the liquid outlet 66, so as to prevent the material from being discharged through the liquid outlet 66, and avoid the material from blocking the arc-shaped material receiving cover 24 after the material is discharged.

The material-allocating mechanism 8 is arranged on the pretreatment drum 5, used to perform alkali pretreating on the material added into the pretreatment drum 5. The material-allocating mechanism 8 includes the second rotation shaft 16 rotationally installed on the pretreatment drum 5, the first gear 17 fixedly installed on the outer surface of the end of the second rotation shaft 16, the resisting block 18 fixedly installed on the side of the first gear 17, the first arc-shaped rack 15 fixedly installed on one of the lateral supports 7 and engaging with the first gear 17, the stroke switches 14 respectively fixed at both ends of the arc-shaped rack 15 and cooperating with the resisting block 18, the disk 19 fixedly installed on the outer surface of the first rotation shaft 6, a plurality of third rotation shafts 20 arranged in a circular array and rotationally installed on the disk 19, a plurality of material-allocating rods 21 fixedly installed on the outer surface of the second rotation shaft 16 and the outer surface of the third rotation shaft 20, the second gear 22 fixedly installed at the end of the third rotation shaft 20, and the inner toothed ring 23 fixedly installed on the inner wall of the pretreatment drum 5 and engaging with a plurality of second gears 22. The side of the inner toothed ring 23 fits on the side of the disk 19, and the first gear 17 engages with the first arc-shaped rack 15, when the second rotation shaft 16 rotates with the pretreatment drum 5 around the axis of the first rotation shaft 6, the first gear 17 will drive the second rotation shaft two 16 to synchronously rotate under the action of the first arc-shaped rack 15. Therefore, at this time, the pretreatment drum 5 rotates around the other axis, while the second rotation shaft 16 rotates on its own axis. Furthermore, the stroke switch 14 cooperates with the resisting block 18, so that the first gear 17 drives the first rotation shaft 16 to move to one end, then control the power drive mechanism 9 to operate in reverse, and then the second rotation shaft 16 can rotate forwards and backwards, and drive the third rotation shaft 20 and the second rotation shaft 16 to synchronously rotate forwards and backwards under the action of the second gear 22 and the inner toothed ring 23, thereby achieve high-precisely allocating materials, enabling the materials to be turned quickly and ensuring uniform degree of exterior and interior material soaked in alkali.

The reciprocating swing mechanism 10 is arranged on the upper surface of the upper baseplate 4, used to drive the pretreatment drum 5 to swing left and right around the axle center of the axis where the first rotation shaft 6 is positioned. The reciprocating swing mechanism 10 includes two articulated arms 32 cooperating with the power drive mechanism 9, the articulated block 33 hinged on the other ends of the two articulated arms 32, the rack plate 34 installed on the side of the articulated block 33, the second arc-shaped rack 60 installed on the outer surface of the pretreatment drum 5 and cooperating with the rack plate 34, and the sliding block 35 installed on the lower surface of the rack plate 34. A strip-shaped channel 67 is opened on the upper surface of the upper baseplate 4, and the first sliding rod 36 is fixed on the inner wall of the strip-shaped channel 67. The sliding block 35 is slidably installed on the outer surface of the first sliding rod 36. The articulated arm 32 cooperates with the power drive mechanism 9, so as to enable the articulated block 33 to drive the rack plate 34 to repeatedly move left and right under the action of the articulated arm 32, when the power drive mechanism 9 operates forwards and backwards. In this way, the rack plate 34 engages with the second arc-shaped rack 60, so as to drive the pretreatment drum 5 to continuously swing repeatedly, and then the cooperation with the material-allocating mechanism 8 effectively improves the stirring effect of materials and further improves the effect of alkali treating. The first sliding rod 36 is configured to cooperate with the sliding block 35, ensuring that the better stability of the rack plate 34 in left and right motion.

The spraying mechanism 12 is arranged on the lower baseplate 2, used to spray lye into the pretreatment drum 5 to perform alkali treatment, and the residue-filtering strainer 13 is arranged on the spraying mechanism 12. The spraying mechanism 12 includes the material box 47 installed on the lower surface of the lower baseplate 2, the spraying pump 51 installed on the side of the material box 47 and having its inlet tube extending to the inside of the material box 47, the delivering pipe 52 communicating with the outlet tube of the spraying pump 51, the installation plate 53 communicating with the other end of the delivering pipe 52 and detachably installed on the upper surface of the pretreatment drum 5, and a plurality of spraying heads 54 installed on the lower surface of the installation plate 53 and communicating with the delivering pipe 52. Two supporting bars 48 is fixedly installed on the inner wall of the material box 47. Two sides of the lower surface of the residue-filtering strainer 13 fit on the upper surfaces of the two supporting bars 48, and the residue-filtering strainer 13 is provided with the installation bolt 50 threadedly installed thereon and connected to the supporting bar 48 by means of the installation bolt 50. A drain is installed on the side of the material box 47. The lye inside the material box 47 is drawn by the spraying pump 51 and conveyed via the delivering pipe 52, then sprayed out through the spraying head 54, so as to achieve an alkali treating operation. Furthermore, the residue-filtering strainer 13 is locked and fixed with the support of the supporting bar 48 and the installation bolt 50, which ensure the effective installation of the residue-filtering strainer 13 and are easy to disassemble and assemble. Furthermore, the residue-filtering strainer 13 can filter the liquid back flowing from the arc-shaped material receiving cover 24 and the connecting tube 25, ensuring the reuse of lye and avoiding wasting.

The first fixing block 55 is fixed on the upper surface of the installation plate 53. A crossbar 68 is slidably installed on the first fixing block 55. The second locking rod 56 is fixed on one end of the crossbar 68, and the locking plate 57 is fixed on the other end of the crossbar 68. The outside of the crossbar 68 is sleeved with the second spring 59 having two ends respectively connected to the first fixing block 55 and the second locking rod 56. The second fixing block 58 is fixed on the upper surface of the pretreatment drum 5. A second locking hole for inserting the first locking rod 44 is opened on the second fixing block 58. The elasticity of the second spring 59 is used to cooperate with the crossbar, so that the crossbar drives the second locking rod 56 to move. In this way, the second locking rod 56 cooperates with the second locking hole on the second fixing block 58, so as to achieve rapidly disassembling and assembling the installation plate 53, providing a simple structure and a convenient operation.

The residue-filtering strainer 13 has three recessed areas 69, among them, one recessed area 69 is located in the middle of the residue-filtering strainer 13, and the other two recessed areas 69 are located on the front and rear sides of the residue-filtering strainer 13. The recessed areas are arranged on the residue-filtering strainer 13, so that the scraper brush 46 can scrap the particles to the recessed areas to be collected during moving, avoiding the blockage caused by the accumulated particles.

The scraping mechanism 11 is arranged on the spraying mechanism 12, used to scrape the material returned to the residue-filtering strainer 13 via the connecting tube 25, ensuring the recycling of lye. The scraping mechanism 11 includes two connecting rods 37 cooperating with the power drive mechanism 9, the sliding plate 38 installed at the end of the connecting rod 37, two lateral supporting plates 40 installed between the two columns 3 on the same side, two second sliding rods 39 installed between the two lateral supporting plates 40 for the sliding plate 38 sliding thereon, and the scraper brush 46 detachably installed on the lower surface of the sliding plate 38. The lower surface of the scraper brush 46 fits on the upper surface of the residue-filtering strainer 13. The connecting rod 37 cooperates with the power drive mechanism 9, so as to drive the sliding plate 38 to synchronously move by means of the connecting rod 37 during the operation of the power drive mechanism 9, and then drive the scraper brush 46 to synchronously move, thereby effectively cleaning the surface of the residue-filtering strainer to avoid the accumulation and blockage of particles.

A plurality of second guiding rods 41 are fixedly installed on the side of the sliding plate 38. The limit disk 42 is fixed on the end of the second guiding rod 41. The guiding plate 49 is slidably installed on the outer surface of the second guiding rod 41. The outside of the second guiding rod 41 is sleeved with the first spring 43 having two ends respectively connected to the limit disk 42 and the guiding plate 49. The first locking rod 44 is fixed on the side of the guiding plate 49. The inserting rod 45 is installed on the upper surface of the scraper brush 46. A rod groove 70 for the inserting rod 45 is opened on the lower surface of the sliding plate 38. A circular hole 71 for inserting the first locking rod 44 and communicating with the rod groove 70 is opened on the sliding plate 38. A first locking hole 72 for inserting the first locking rod 44 is opened on the inserting rod 45. The second guiding rod 41 cooperates with the first spring 43, so as to guide and support the guiding plate 49, so that the guiding plate 49 has better stability during moving, and it is not easy to shake, furthermore, the guiding plate 49 has better stability when it drives the first locking rod 44 to move. The first locking rod 44 cooperates with the first locking hole 72, to achieve rapidly disassembling and assembling the scraper brush 46, so it is convenient for operation and use.

The power drive mechanism 9 is arranged on the side of the upper baseplate 4, used to drive the reciprocating swing mechanism 10 and the scraping mechanism 11 to synchronously operate. The power drive mechanism 9 includes two lateral keeping-off blocks 26 fixedly installed on the side of the upper baseplate 4, the fourth rotation shaft 27 rotationally installed on the lateral keeping-off block 26, the motor 29 installed on the side of one of lateral keeping-off blocks 26 and having its output shaft connected to the fourth rotation shaft 27, the bidirectional screw 28 fixedly installed between two fourth rotation shafts 27, and two moving blocks 30 threadedly installed on the two-segment threaded outer surface of the bidirectional screw 28. The upper surface of the moving block 30 is connected with one end of the articulated arm 32 by means of a hinge joint. The side of the moving block 30 is fixedly connected with one end of the connecting rod 37. The first guiding rod 31 is installed between the two lateral keeping-off blocks 26. The moving block 30 is slidably installed on the outer surface of the first guiding rod 31. The motor 29 is electrically connected with the stroke switch 14. The fourth rotation shaft 27 is configured to cooperate with the bidirectional screw 28 and the motor 29, the motor 29 drives the fourth rotation shaft 27 to rotate during its operation, the fourth rotation shaft 27 rotates to drive the bidirectional screw 28 to rotate, and then the latter drives the moving block 30 to move. Meanwhile, the stroke switch 14 cooperates with the motor 29, so as to control the motor 29 to rotate forwards and backwards and then achieve the relative movement of the two moving blocks 30, thereby enabling the pretreatment drum 5 to repeatedly swing and the scraper brush 46 to move forwards and backwards.

The present invention also provides a method of use of the device for pretreating refined cotton, comprising the steps of:

S1, feeding, pressing the locking plate 57 to drive the crossbar to move, enabling the crossbar to drive the second locking rod 56 to disengage the second locking hole on the second fixing block 58, unlocking the installation plate 53, removing the installation plate 53, adding the material to be processed into the pretreatment drum 5, after adding the material, pulling the locking plate 57 again to misalign the second locking rod 56 with the first fixing block 55, after placing the installation plate 53 on the pretreatment drum 5, driving the second locking rod 56 to return its original position to be inserted into the second locking hole 72 on the second fixing block 58 under the action of the elasticity of the second spring 59, finishing locking the installation plate 53, or instead of the above, directly the material from the both sides of the installation plate 53, then pouring lye into the material box 47;

S2, alkali pretreating, starting the motor 29 to enable the motor 29 to drive the bidirectional screw 28 to rotate by means of the fourth rotation shaft 27, enabling the bidirectional screw 28 to rotate to drive two moving blocks 30 to move with respect to each other, for the two moving blocks 30 during moving close to each other, enabling the articulated block 33 to drive the rack plate 34 to move left under the articulation of the articulated arm 32, at this time under the engagement of the rack plate 34 and the second arc-shaped rack 60, enabling the pretreatment drum 5 to swing clockwise around the axis of the first rotation shaft 6, for the pretreatment drum 5 during swinging clockwise, driving the second rotation shaft 16 to synchronously rotate around the axis of the first rotation shaft 6, for the second rotation shaft 16 during following the pretreatment drum 5, driving the first rotation shaft 6 to rotate under the engagement of the first gear 17 and the first arc-shaped rack 15, meanwhile for the first rotation shaft 6 during its rotation, driving the disk 19 to rotate and enabling the third rotation shaft 20 to synchronously rotate under the engagement of the second gear 22 and the inner toothed ring 23 so as to enable the second rotation shaft 16 and the third rotation shaft 20 to rotate synchronously, for first gear 17 at moving until the keeping-off block 18 touches the stroke switch 14 on one side, driving the motor 29 to reverse, and then driving the two moving blocks 30 to move far away from each other, so as to enable the articulated block 33 to drive the rack plate 34 to move right under the articulation of the articulated arm 32, thus drive the pretreatment drum 5 to swing counterclockwise and drive the second rotation shaft 16 and the third rotation shaft 20 to rotate counterclockwise, for the keeping-off block 18 at touching the stroke switch 14 on the other side, controlling the motor 29 to reverse, so as to move backwards and forwards to enable the pretreatment drum 5 to effectively swing and vibrate with the material-allocating rods 21, meanwhile for spraying pump 51, drawing the lye in the material box 47 to spray to the pretreatment drum 5 via the delivering pipe 52 and the spraying head 54, so as to achieve alkali pretreating by way of cooperating with the material-allocating rods 21; and S3, reusing lye, enabling excess lye to back flow and fall via the arc-shaped material-receiving cover 24 and the connecting tube 25, filtering large particles under the action of the residue-filtering strainer 13 so as to flow back the liquid for reuse, meanwhile for the moving block 30 during moving repeatedly, driving the sliding plate 38 to move by means of the connecting rod 37 so as to enable the sliding plate 38 to drive the scraper brush 46 to move backwards and forwards, thus for the scraper brush 46, scraping the particles on the residue-filtering strainer 13 into the recessed area of the residue-filtering strainer 13 to prevent the accumulation and blockage of the particles on the surface of the residue-filtering strainer 13, if needing to clean the residue-filtering strainer 13, firstly pulling the guiding plate 49 to drive the first locking rod 44 to move, so as to release the fixation of the scraper brush 46, secondly removing the scraper brush 46 then unscrewing the installation bolt 50 to release the fixation of the residue-filtering strainer 13, finally pulling out the residue-filtering strainer 13 upwards.

What is claimed is:

1. A device for pretreating refined cotton, comprising a body frame (1), a pretreatment drum (5), a material-allocating mechanism (8), a reciprocating swing mechanism (10), a spraying mechanism (12), a scraping mechanism (11), and a power drive mechanism (9);

wherein said body frame (1) includes a lower baseplate (2), four columns (3) mounted on an upper surface of the lower baseplate (2), and an upper baseplate (4) mounted at a top of the four columns (3);

wherein first rotation shafts (6) are fixed on front and rear sides of said pretreatment drum (5), a lateral support (7) is rotationally installed on an outer surface of the first rotation shaft (6), and fixedly on an upper surface of the upper baseplate (4), a discharge door is hinged on a back of said pretreatment drum (5), an arc-shaped material receiving cover (24) is fixedly installed on the upper baseplate (4), a liquid outlet (66) facing the arc-shaped material receiving cover (24) is opened on an outer surface of said pretreatment drum (5), a strainer (65) is installed on an inner wall of the liquid outlet (66), a connecting tube (25) is installed on the arc-shaped material receiving cover (24), and passes through the upper baseplate (4) and extends to a lower part of the upper baseplate (4);

wherein said material-allocating mechanism (8) is arranged on said pretreatment drum (5), used to perform alkali pretreating on materials added into said pretreatment drum (5);

wherein said reciprocating swing mechanism (10) is arranged on the upper surface of the upper baseplate (4), used to drive said pretreatment drum (5) to swing left and right around an axle center of an axis where the first rotation shaft (6) is positioned;

wherein said spraying mechanism (12) is arranged on the lower baseplate (2), used to spray lye into said pretreatment drum (5) to perform alkali treatment, and a residue-filtering strainer (13) is arranged on said spraying mechanism (12);

wherein said scraping mechanism (11) is arranged on said spraying mechanism (12), used to scrape the materials returned to the residue-filtering strainer (13) via the connecting tube (25), ensuring the recycling of lye;

wherein said power drive mechanism (9) is arranged on a side of the upper baseplate (4), used to drive said reciprocating swing mechanism (10) and said scraping mechanism (11) to synchronously operate.

2. The device for pretreating refined cotton according to claim 1, wherein said material-allocating mechanism (8)

includes a second rotation shaft (16) rotationally installed on said pretreatment drum (5), a first gear (17) fixedly installed on an outer surface of an end of the second rotation shaft (16), a resisting block (18) fixedly installed on a side of the first gear (17), a first arc-shaped rack (15) fixedly installed on one of the lateral supports (7) and engaging with the first gear (17), stroke switches (14) respectively fixed at both ends of the arc-shaped rack (15) and cooperating with the resisting block (18), a disk (19) fixedly installed on the outer surface of the first rotation shaft (6), a plurality of third rotation shafts (20) arranged in a circular array and rotationally installed on the disk (19), a plurality of material-allocating rods (21) fixedly installed on the outer surface of the second rotation shaft (16) and an outer surface of the third rotation shaft (20), a second gear (22) fixedly installed at an end of the third rotation shaft (20), and an inner toothed ring (23) fixedly installed on an inner wall of said pretreatment drum (5) and engaging with a plurality of second gears (22), and a side of the inner toothed ring (23) fits on a side of the disk (19).

3. The device for pretreating refined cotton according to claim 2, wherein said reciprocating swing mechanism (10) includes two articulated arms (32) cooperating with said power drive mechanism (9), an articulated block (33) hinged on the other ends of the two articulated arms (32), a rack plate (34) installed on a side of the articulated block (33), a second arc-shaped rack (60) installed on the outer surface of said pretreatment drum (5) and cooperating with the rack plate (34), and a sliding block (35) installed on a lower surface of the rack plate (34), a strip-shaped channel (67) is opened on the upper surface of the upper baseplate (4), a first sliding rod (36) is fixed on an inner wall of the strip-shaped channel (67), the sliding block (35) is slidably installed on an outer surface of the first sliding rod (36).

4. The device for pretreating refined cotton according to claim 3, wherein said spraying mechanism (12) includes a material box (47) installed on a lower surface of the lower baseplate (2), a spraying pump (51) installed on a side of the material box (47) and having its inlet tube extending to an inside of the material box (47), a delivering pipe (52) communicating with an outlet tube of the spraying pump (51), an installation plate (53) communicating with the other end of the delivering pipe (52) and detachably installed on the upper surface of said pretreatment drum (5), and a plurality of spraying heads (54) installed on a lower surface of the installation plate (53) and communicating with the delivering pipe (52), two supporting bars (48) is fixedly installed on an inner wall of the material box (47), two sides of a lower surface of the residue-filtering strainer (13) fit on an upper surfaces of the two supporting bars (48), the residue-filtering strainer (13) is provided with an installation bolt (50) threadedly installed thereon and connected to the supporting bar (48) by means of the installation bolt (50), and a drain is installed on the side of the material box (47).

5. The device for pretreating refined cotton according to claim 4, wherein said scraping mechanism (11) includes two connecting rods (37) cooperating with said power drive mechanism (9), a sliding plate (38) installed at an end of the connecting rod (37), two lateral supporting plates (40) installed between two columns (3) on the same side, two second sliding rods (39) installed between the two lateral supporting plates (40) for the sliding plate (38) sliding thereon, and a scraper brush (46) detachably installed on a lower surface of the sliding plate (38), and a lower surface of the scraper brush (46) fits on an upper surface of the residue-filtering strainer (13).

6. The device for pretreating refined cotton according to claim 5, wherein said power drive mechanism (9) includes two lateral keeping-off blocks (26) fixedly installed on the side of the upper baseplate (4), a fourth rotation shaft (27) rotationally installed on the lateral keeping-off block (26), a motor (29) installed on a side of one of lateral keeping-off blocks (26) and having its output shaft connected to the fourth rotation shaft (27), a bidirectional screw (28) fixedly installed between two fourth rotation shafts (27), and two moving blocks (30) threadedly installed on two-segment threaded outer surface of the bidirectional screw (28), an upper surface of the moving block (30) is connected with one end of the articulated arm (32) by means of a hinge joint, a side of the moving block (30) is fixedly connected with one end of the connecting rod (37), a first guiding rod (31) is installed between the two lateral keeping-off blocks (26), the moving block (30) is slidably installed on an outer surface of the first guiding rod (31), and the motor (29) is electrically connected with the stroke switch (14).

7. The device for pretreating refined cotton according to claim 6, wherein the first fixing block (55) is fixed on an upper surface of the installation plate (53), a cross bar (68) is slidably installed on the first fixing block (55), a second locking rod (56) is fixed on one end of the crossbar (68), a locking plate (57) is fixed on the other end of the crossbar (68), an outside of the crossbar (68) is sleeved with a second spring (59) having two ends respectively connected to the first fixing block (55) and the second locking rod (56), a second fixing block (58) is fixed on the upper surface of said pretreatment drum (5), and a second locking hole (73) for inserting a first locking rod (44) is opened on the second fixing block (58).

8. The device for pretreating refined cotton according to claim 7, wherein the residue-filtering strainer (13) has three recessed areas (69), among them, one recessed area (69) is located in a middle of the residue-filtering strainer (13), and the other two recessed areas (69) are located on the front and rear sides of the residue-filtering strainer (13).

9. The device for pretreating refined cotton according to claim 8, wherein a plurality of second guiding rods (41) are fixedly installed on a side of the sliding plate (38), a limit disk (42) is fixed on an end of the second guiding rod (41), a guiding plate (49) is slidably installed on an outer surface of the second guiding rod (41), an outside of the second guiding rod (41) is sleeved with a first spring (43) having two ends respectively connected to the limit disk (42) and the guiding plate (49), the first locking rod (44) is fixed on a side of the guiding plate (49), an inserting rod (45) is installed on an upper surface of the scraper brush (46), a rod groove (70) for the inserting rod (45) is opened on the lower surface of the sliding plate (38), a circular hole (71) for inserting the first locking rod (44) and communicating with the rod groove (70) is opened on the sliding plate (38), and a first locking hole (72) for inserting the first locking rod (44) is opened on the inserting rod (45).

10. A method of use of the device for pretreating refined cotton according to claim 1, comprising the steps of:

S1, feeding, pressing the locking plate (57) to drive the crossbar to move, enabling the crossbar to drive the second locking rod (56) to disengage the second locking hole on the second fixing block (58), unlocking the installation plate (53), removing the installation plate (53), adding the material to be processed into the pretreatment drum (5), after adding the material, pulling the locking plate (57) again to misalign the second locking rod (56) with the first fixing block (55), after placing the installation plate (53) on the pretreatment drum (5), driving the second locking rod (56) to return its original position to be inserted into the second locking hole (73) on the second fixing block (58) under the action of the elasticity of the second spring (59), finishing locking the installation plate (53), or instead of the above, directly the material from the both sides of the installation plate (53), then pouring lye into the material box (47);

S2, alkali pretreating, starting the motor (29) to enable the motor (29) to drive the bidirectional screw (28) to rotate by means of the fourth rotation shaft (27), enabling the bidirectional screw (28) to rotate to drive two moving blocks (30) to move with respect to each other, for the two moving blocks (30) during moving close to each other, enabling the articulated block (33) to drive the rack plate (34) to move left under the articulation of the articulated arm (32), at this time under the engagement of the rack plate (34) and the second arc-shaped rack (60), enabling the pretreatment drum (5) to swing clockwise around the axis of the first rotation shaft (6), for the pretreatment drum (5) during swinging clockwise, driving the second rotation shaft (16) to synchronously rotate around the axis of the first rotation shaft (6), for the second rotation shaft (16) during following the pretreatment drum (5), driving the first rotation shaft (6) to rotate under the engagement of the first gear (17) and the first arc-shaped rack (15), meanwhile for the first rotation shaft (6) during its rotation, driving the disk (19) to rotate and enabling the third rotation shaft (20) to synchronously rotate under the engagement of the second gear (22) and the inner toothed ring (23) so as to enable the second rotation shaft (16) and the third rotation shaft (20) to rotate synchronously, for first gear (17) at moving until the keeping-off block (18) touches the stroke switch (14) on one side, driving the motor (29) to reverse, and then driving the two moving blocks (30) to move far away from each other, so as to enable the articulated block (33) to drive the rack plate (34) to move right under the articulation of the articulated arm (32), thus drive the pretreatment drum (5) to swing counterclockwise and drive the second rotation shaft (16) and the third rotation shaft (20) to rotate counterclockwise, for the keeping-off block (18) at touching the stroke switch (14) on the other side, controlling the motor (29) to reverse, so as to move backwards and forwards to enable the pretreatment drum (5) to effectively swing and vibrate with the material-allocating rods (21), meanwhile for spraying pump (51), drawing the lye in the material box (47) to spray to the pretreatment drum (5) via the delivering pipe (52) and the spraying head (54), so as to achieve alkali pretreating by way of cooperating with the material-allocating rods (21); and S3, reusing lye, enabling excess lye to back flow and fall via the arc-shaped material-receiving cover (24) and the connecting tube (25), filtering large particles under the action of the residue-filtering strainer (13) so as to flow back the liquid for reuse, meanwhile for the moving block (30) during moving repeatedly, driving the sliding plate (38) to move by means of the connecting rod (37) so as to enable the sliding plate (38) to drive the scraper brush (46) to move backwards and forwards, thus for the scraper brush (46), scraping the particles on the residue-filtering strainer (13) into the recessed area of the residue-filtering strainer (13) to prevent the accumulation and blockage of the particles on the surface of the residue-filtering strainer (13), if needing to clean the residue-filtering strainer (13), firstly pulling the guiding plate (49) to drive the first locking rod (44) to move, so as to release the fixation of the scraper brush (46), secondly removing the scraper brush (46) then unscrewing the installation bolt (50) to release the fixation of the residue-filtering strainer (13), finally pulling out the residue-filtering strainer (13) upwards.

\* \* \* \* \*